(12) United States Patent
Hostetter et al.

(10) Patent No.: US 9,443,550 B2
(45) Date of Patent: Sep. 13, 2016

(54) DATA STORAGE SYSTEM PROVIDING EFFICIENT AND SECURE DATA MIGRATION WITH TAPE DRIVE TECHNOLOGY

(71) Applicant: Oracle International Corporation, Redwood City, CA (US)

(72) Inventors: David G. Hostetter, Louisville, CO (US); Steven Castle Sanders, Golden, CO (US); Kathryn L. Baker, Redwood City, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 93 days.

(21) Appl. No.: 14/609,497

(22) Filed: Jan. 30, 2015

(65) Prior Publication Data
US 2016/0225403 A1 Aug. 4, 2016

(51) Int. Cl.
| | | |
|---|---|---|
| G06F 12/00 | (2006.01) |
| G11B 20/00 | (2006.01) |
| G11B 5/008 | (2006.01) |
| G11B 20/18 | (2006.01) |
| G06F 13/00 | (2006.01) |
| G06F 13/28 | (2006.01) |
| G11B 20/10 | (2006.01) |

(52) U.S. Cl.
CPC ....... *G11B 20/0021* (2013.01); *G11B 5/00813* (2013.01); *G11B 20/1833* (2013.01); *G11B 2020/10833* (2013.01); *G11B 2020/1843* (2013.01)

(58) Field of Classification Search
CPC .......... G11B 20/0021; G11B 20/1833; G11B 5/00813; G11B 2020/1843; G11B 2020/10833
See application file for complete search history.

(56) References Cited

U.S. PATENT DOCUMENTS

| | | | | |
|---|---|---|---|---|
| 5,564,037 A | * | 10/1996 | Lam | ...... G06F 3/0608 707/999.202 |
| 5,883,864 A | * | 3/1999 | Saliba | ...... G11B 17/225 360/92.1 |
| 2007/0220402 A1 | * | 9/2007 | Hagi | ...... G11B 20/10527 714/766 |
| 2013/0282996 A1 | * | 10/2013 | Kalos | ...... H04L 29/08 711/161 |

* cited by examiner

*Primary Examiner* — Mark Giardino, Jr.
(74) *Attorney, Agent, or Firm* — Marsh Fischmann & Breyfogle LLP; Kent A. Lembke

(57) ABSTRACT

A data storage system that includes a data migration assembly implemented using tape drive technology. The migration assembly includes tape drive modules or cards stacked within a tape drive chassis, which is adapted for insertion into a tape drive slot of a library or rack enclosure. The data storage system includes a server running a host application to manage data migration processes by transmitting control commands and/or parameters to the tape drive module. The tape drive module, in response, performs the data migration including data extraction from the source device and data loading onto the destination device. The data path passes between the source and destination devices through the tape drive cards but does not include the server running the host application so that data security is provided by the tape drive module along the entire data path rather than data being at risk in a server.

22 Claims, 6 Drawing Sheets

DATA STORAGE SYSTEM PROVIDING EFFICIENT AND SECURE DATA MIGRATION WITH TAPE DRIVE TECHNOLOGY

BACKGROUND

1. Field of the Description

The present description relates to data storage and magnetic tape data storage and, in particular, to methods and systems for improving data migration such as from one data storage device (e.g., a first magnetic tape cartridge using a first technology) to a second data storage device (e.g., a second magnet tape cartridge using a second (typically, newer) technology), from a tape library to storage devices accessible over the Internet (e.g., cloud-based storage), or, more generally, from any data storage device to any other data storage device.

2. Relevant Background

For decades, magnetic tape data storage has offered cost and storage density advantages over many other data storage technologies including disk storage. A typical medium to large-sized data center will deploy both tape and disk storage to complement each other and with the tape storage often used for backup and archival data storage. Due to the increased need for securely storing data for long periods of time and due to the low cost of tape, it is likely that tape-based data storage will continue to be utilized and its use will only expand for the foreseeable future. Briefly, magnetic tape data storage uses digital recording on to magnetic tape to store digital information, and the tape is packaged in cartridges and cassettes (i.e., the storage media or simply "media"). The device that performs writing and reading of data is a tape drive, and tape drives are often installed within drive slots of robotic tape libraries, and these libraries may be quite large and hold thousands of cartridges and many drives to provide a tremendous amount of data storage (e.g., each tape may hold several terabytes of uncompressed data).

One difficult issue facing data managers and designers of data storage networks or systems is how to provide data migration in an effective manner. Data migration is the process of making an exact copy of a set of data (e.g., an organization's archived data) from one device to another device and then redirecting all input/output (I/O) activity to the new device. Preferably, the data migration will be planned so active applications are not disrupted or disabled during data migration, and a host application (e.g., a copy or data migration manager software module or application) may be run on a server to manage the process and provide automated migration by transferring data between storage types, formats, and/or computer systems. This host application may act to map data from the old or existing data storage system and its devices (e.g., tape cartridges) to the new data storage system and its devices, thereby providing a design for data extraction and data loading.

There is a wide variety of reasons that an organization may perform a data migration including: (a) storage technology replacement or upgrade (e.g., changeover to new magnetic tape technology); (b) storage consolidation; (c) relocation of a data center; and (d) storage equipment maintenance. Data migrations are performed regularly for many organizations such as quarterly or more often, but even such a routine process such as data migration is not without problems. The problems may include: (a) extended and/or unexpected downtime during data migration (e.g., data migration can be a very time consuming process depending upon the amount of data being migrated and/or number of data storage devices affected by the migration); (b) data corruption or loss; (c) application performance issues during the migration (e.g., data migration may be competing with data processing bandwidth on a server(s)) and after the migration is completed; and (d) compatibility issues after the data migration.

In many cases, data migration presently involves a device-to-device copy (e.g., tape cartridge-to-tape cartridge copy) using a traditional server. The server is communicatively linked to both the source devices and the target or destination devices, and a host application (e.g., a "migration manager") is run by one or more processors on the server to manage data migration including automating all or portions of the data extraction and data loading processes. FIG. 1 illustrates a conventional data storage system or network 100 during data migration. In this example, data is being copied from a data storage source (e.g., a tape library implemented with a first tape technology) to a data storage target (e.g., a tape library or libraries implementing the same tape technology or, as is common, implementing a newer tape technology).

A communication link device (e.g., a Fibre Channel (FC) switch or other device(s)) 130 is used to provide a digital communication link, as shown with lines 112, 122, between the source 110 and target 120 for this data migration. A server 150 is also linked, as shown with line 152, to data storage source 110 and the data storage target 120 via the link device 130. The dedicated server 150 includes a host adapter (e.g., a host bus adapter (HBA)) that connects the server 150 to the network device 130 and storage devices 110, 120. The server 150 also includes one or more processors 156 that manage the host adapter 154, execute or run software including the host application (e.g., copy or data migration manager 158), and manage data storage devices or memory 160. As shown in FIG. 1, the data path 160 for the data being migrated or copied is from the data storage source (e.g., a first tape cartridge in a first tape library during extraction) 110, through the communication link device 130, to the dedicated server 150, and then back through the communication link device 130 to the data storage target 120 (e.g., a second tape cartridge in a second tape library during loading). The control path 159 is between the host application 158 and other components within the server 150.

A number of problems can arise during data migration in traditional systems such as the data storage system 100 shown in FIG. 1. When servers are used to copy from a source device to a target or destination device, the data is not fully protected, with regard to security and data integrity issues, throughout the entire data path. As shown in the system 100 of FIG. 1, the data path 160 passes from the communication link device 130 to and into the dedicated server 150. Once the data has passed the host bus adapter (HBA) 154 and is being moved within the server 150, there is exposure in memory (or disk) 160 as shown with the migrating data 162 that is in an unsecure (e.g., unencrypted) or potentially corrupt (e.g., missing data) state. Another issue with the use of a server for data migration is that the migration processes being performed by the host application often will have to compete for server or processing bandwidth with other applications/processes running on the server. For example, the maximum available bandwidth may be several hundred megabytes (MB) per second, but this will be reduced if data migration is performed concurrently with other server processes.

Hence, there remains a need for improved methods and systems for performing data migration in a data storage system. Preferably, such methods and systems would be compatible with existing data storage devices (e.g., with tape storage technologies and devices) and with existing host applications (e.g., existing copy or data migration managers) while improving migration efficiency and/or providing increased data security during the entire migration process.

SUMMARY

The inventors recognized that the data storage industry performs device-to-device copy in a data migration using a traditional server running a host application such as an off-the-shelf copy manager. The server typically is ordered with "N" (or a particular number of) processors, and, once ordered, the server is very difficult to scale upwards because the processing bandwidth is fixed. As a result, a data storage customer is forced to purchase and install another server to increase the speed with which a data migration can be completed, which can be costly. Further, simply installing additional servers with host applications does not address the problem of data security being lost or potentially compromised during data migration. For example, when the data has passed the host bus adapter, for example, in a server, data integrity errors may occur in present data migration processes.

To provide enhanced data security and greatly improved speed in data migration, a data storage system (as well as a data migration method implemented with such as system) is provided that includes a data migration assembly implemented using tape drive technology. The data storage system provides one or more tape drive modules (or one or more tape drive cards, such as the TDM card provided in tape drives distributed by Oracle Corporation), in a drive-based data migration assembly, between the data storage source and the data storage destination. The data storage system also includes a server running a host application (e.g., a copy or data migration manager) to manage data migration processes, and the host application communicates control commands and/or parameters to the tape drive module.

The tape drive module, in response, performs the data migration including data extraction from the source device and data loading onto the destination device. In this manner, the data path passes between the source and destination devices through the tape drive module, but, in contrast to prior systems such as system 100 of FIG. 1, the data path does not include the server running the host application. In this manner, data security can be provided by the tape drive module (or tape drive card) so that data security is maintained along the entire data path rather than being at risk in the server. Further, the data migration can proceed at a much quicker rate as the tape drive module or card can be dedicated to performing data migration rather than having to compete with other processes for bandwidth (e.g., for server bandwidth as was the case with a host application in prior systems such as system 100 of FIG. 1).

In some embodiments, the tape drive modules are provided in a drive-based data migration assembly provided in the data path between the source and destination devices. Particularly, the inventors recognized that the migration assembly can be provided by "stacking" two, three, or more tape drive digital technology cards on top of each other inside of a tape drive chassis, which has been optionally modified to remove the tape cartridge mechanics. The number of tape drive modules or cards that are stacked in a particular chassis can be increased or decreased at anytime to quickly scale the data migration capacity of a data storage system up or down in a cost effective and speedy manner. This allows a data storage system operator (or customer) to scale horizontal depending on their needs and addresses the problem of having to buy another server. Further, each tape drive module or card includes one or more processes or applications that implement data protection processes (e.g., a data protection manager or mechanism provided as a standalone routine or a subroutine run/executed by a processor of the tape drive module or card). In this way, data is protected using tape drive technologies rather than allowing data to be exposed to security and/or data loss risks in a server. Since the drive-based data migration assembly is provided within a tape drive chassis, the migration assembly with 1 to 3 or more tape drive modules or cards may be provided in a tape drive slot of a tape library or a traditional rack of a storage system (e.g., a tape drive slot of a rackmount enclosure or the like).

More particularly, a data migration assembly is provided that is useful in data storage systems to facilitate higher performance data migration with improved data protection. The assembly includes a chassis configured for insertion into a tape drive slot of a tape library or a rack enclosure (e.g., the chassis may be a conventional tape drive chassis or box that has been modified to remove the tape drive cartridge handling mechanics or that is free of such components to free up space for data migration components). The data migration assembly (or data migration "box") includes a first tape drive card supported within an interior space of the chassis.

The first tape drive card includes a processor and a copy manager run by the processor (e.g., computer code or software executed to provide functions of the copy manager). The copy manager is adapted to communicate with a host application, which is running on a server that is communicatively linked to the first tape drive card, during a data migration to receive data migration control parameters from the host application. In response to receipt and processing of these control parameters, the copy manager causes the first tape drive card to copy a set of data from one or more source data storage devices to one or more destination data storage devices (e.g., from one tape cartridge to a second tape cartridge).

In some embodiments, the first tape drive card includes one or more memory devices providing random access memory (RAM), and the copy manager partitions the RAM into a number of partitions for use in performing a like number of migration sessions such that each of the migration sessions has a dedicated portion of the RAM to better assure data integrity during migration. In many cases, the number of migration sessions is greater than two, and the migration sessions are performed concurrently by the copy manager.

The data migration assembly may be implemented such that the first tape drive card includes a data protection application or module run by the processor to apply a data protection process to the set of data to enhance data security during the data migration. For example, the data protection process may be applied during reads from the one or more source data storage devices and during writes to the one or more destination data storage devices. In a particular, but not limiting case, the data protection process includes performing cyclic redundancy checks (CRCs). In the same or other cases, the data protection process is performed whereby data encryption is provided and/or retained during the reads and the writes performed to copy the data from the source to the destination devices.

While a single tape drive card may be used to implement the assembly, another envisioned embodiment of the assembly further includes a second and a third tape drive card (or more) each typically (but not necessarily) having a configuration matching the first tape drive card, e.g., to perform concurrent and independent copying of data from other data sources to the same or other data destination devices in migration sessions. In some embodiments, the second and third tape drive cards are provided in a stacked arrangement with the first tape drive card within the interior space of the chassis, e.g., with each card or card body being parallel (and spaced apart relative) to other cards or card bodies in the stack.

DETAILED DESCRIPTION

Briefly, methods and systems are provided for improving device-to-device copying of data or "data migration." More specifically, a data migration assembly is taught for use within a data storage system or network to perform data migration under the control of (e.g., based on control parameters from) a host application running on a separate server. The data migration assembly may be implemented with a tape drive with its tape drive card or module modified with new software (i.e., a drive-based copy manager) to communicate with the host application to accept the control parameters. The drive-based copy manager then manages the data migration application process.

The tape drive can be dedicated for performing the data migration and be provided in a drive slot of a tape library or a slot/space within a rack enclosure. The migration-dedicated tape drive is provided or positioned within the data path between the data source and the data destination (e.g., between a first tape library and a second tape library) such that the data path for the data migration does not need to include the server running the host application. In this manner, full data protection can be provided along the entire data path. In a typical data migration assembly, two, three, or more tape drive modules or cards that have been modified or designed to support data migration are provided within a tape drive chassis. This may be achieved by removing tape cartridge mechanical components from a tape drive (or designing a new "drive" without such mechanics) and placing or stacking additional cards adjacent the original (but modified for migration processes) card of the tape drive.

The use of a "server-like" tape drive as a drive-based data migration assembly in a data storage system provides for data migration with better performance. For example, the tape drive cards or modules may each be dedicated to migration such that the migration processes are not competing with other applications or functions of a server for bandwidth as was the case with server-based migration. Additionally, it is likely that the product cost for each assembly will be significantly less than would be required to provide additional servers to support data migration.

Figure 2:
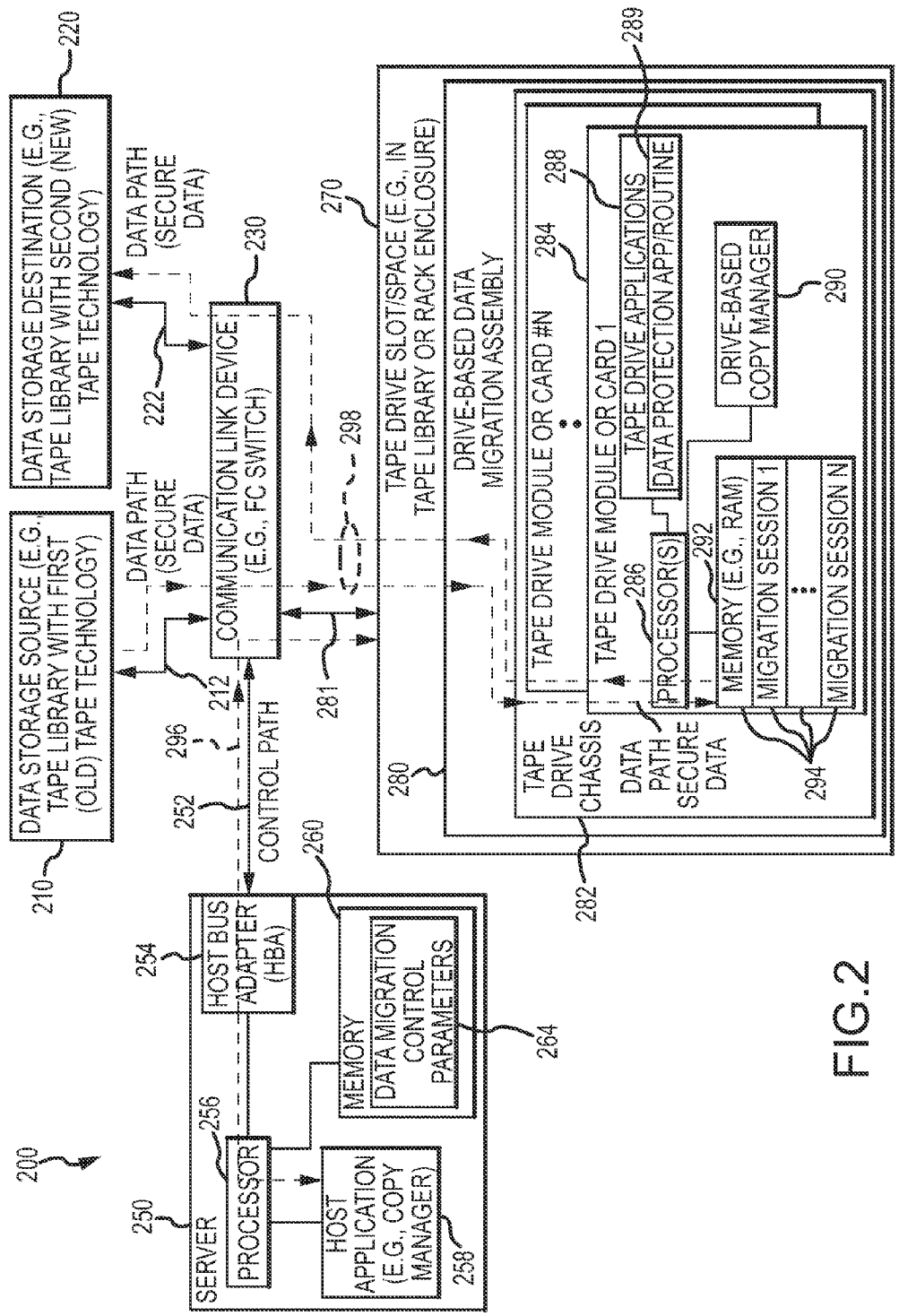
FIG. 2 illustrates a functional block diagram of a data storage system implementing a tape-drive-based data migration assembly of the present description to facilitate data migration.

FIG. 2 illustrates a functional block diagram of a data storage system 200 including a tape-drive-based data migration assembly 280 of the present description to facilitate data migration. As shown, the system 200 includes a data storage source 210 and a data storage destination 220. Both the source 210 and destination 220 are adapted to store data in digital form, and it is desired to migrate or copy data from the source 210 to the destination 220. The source 210 may take many forms to practice the system 200 such as a tape library with a plurality of tape cartridges storing data, disk-based storage devices, data storage devices accessible over the Internet (e.g., "cloud storage"), another data storage device, or a combination of such data storage devices. Likewise, the data storage destination 220 may take the form of one-to-many data storage devices of varying form and/or type with tape cartridges in one or more tape libraries being only one useful example.

As with system 100, the data storage system 200 includes one or more communication link devices 230 such as FC switches, that are used to communicatively link, via links 212, 222, the migration source 210 and migration destination 220 to allow data to be transferred during data migration. Further, the system 200 includes a server 250 linked to the communication link device 230 via link 252. The server 250 includes a host bus adapter (HBA) 254 connecting the server 250 to the network of the system 200. A processor(s) 256 is included in the server 250 that acts to execute code to provide a host application (e.g., a copy manager) 258 and to manage memory 264. The host application 258 is configured to control a data migration from source 210 to destination 220, and the application 258 may provide a graphical user interface (GUI) on a monitor of a computer device (not shown in FIG. 2) linked to the server 250. The host application 250 may respond to user input from such a GUI to initiate a data migration at a particular time and in a particular manner. To this end, the host application 258 may generate control parameters 264 that are stored in memory 260 for later transmittal to tape-drive technology devices used to perform the data migration.

In this regard, the data storage system 200 includes a drive-based data migration assembly 280 that is communicatively linked via link 281 to both the source 210 and the destination 220 as well as the server 250 via the communication link device 230. In this way, the control parameters 264 can be transmitted over links 252 and 281 to the data migration assembly 280 to cause the assembly 280 to perform data migration between the source 210 and the destination 220 (or between storage devices within each such as between two tape cartridges). As shown, the control path 296 for the data migration is between the server 250 and the data migration assembly 280, but, more importantly, the data path 298 extends between the source 210 and the destination 220 through the data migration assembly 280 (e.g., through one of the cards 284) rather than through the server 250, which allows data security to be maintained throughout the migration process.

As shown, the data migration assembly 280 includes a tape drive chassis 282, which may include the enclosure panels as well as electrical and communication connections. In some cases, the tape cartridge mechanical components (not shown) are retained in the chassis 282 (such as when only one card 284 is included), but many embodiments of the assembly 280 will utilize a chassis 282 with tape cartridge components removed to provide room for two or more of the cards 284. With the use of the tape drive chassis 282, the data migration assembly 280 may readily be inserted into a tape drive slot or space 270 to allow convenient powering, cooling, and communications with the assembly 280 and its components. For example, the data migration assembly 280 may be inserted into a tape drive slot 270 of a tape library (e.g., a tape library that is the source 210 or the destination 220 for the migration or another tape library in the data storage system 200), into a slot in a rack blade, in a slot of a rackmount enclosure, or other mounting system/device for tape drives.

In the tape drive chassis 282, the data migration assembly 280 includes one, two, three, or more (or "N") tape drive modules or cards 284. The number of cards 284 may be chosen to suit the form factor of the chassis 282 and the size of the cards 284 or may be chosen to meet a particular data storage system 200 or its operator's needs. Each module or card 284 includes a processor(s) 286 managing memory (e.g., random access memory (RAM)) 292 and also executing code associated with tape drive applications 288 and a drive-based copy manager 290.

The tape drive applications 288 include at least one data protection application or routine 289 that provides data protection for the data being migrated while the data is on the card 284. For example, the data protection application 289 may provide data protection while performing reads (during extraction portions of the migration) and during writes (during loading portions of the migration). The data protection application (or data protection module) 289 may apply a data protection process to each data chunk or portion of data as it is being migrated from the source 210 to the destination 220 to better insure data integrity. For example, the application 289 may be configured to provide an industry standard data protection process such as T10 DIF (e.g., the ANSI T1 standard defines a way to check the integrity of data read and written by the card 284) or another process defined by an existing standard or that may later be defined by a standard or otherwise by engineers or scientists in the data storage industry. Applying T10 DIF with the data protection application or module 289 is useful for providing end-to-end data protection during the data migration, e.g., with a cyclic redundancy check (CRC) to protect against errors in the data, and over the entire data path 298.

The drive-based copy manager 290 is software that may be added to a tape drive card 284 to allow the card 284 to communicate with the host application 258. These communications include indicating the availability of the card 284 containing the manager 290 to perform migrations and the host application 258 transmitting the control parameters 264 over the control path 296. In response, the copy manager 290 performs and/or manages a data migration between the source 210 and the destination 220 (or data storage devices therein). When the assembly 280 is placed in a tape library drive slot 270, the copy manager 290 may also act to communicate with the library manager/host to indicate that the assembly 280 is not a conventional tape drive, i.e., it is dedicated to migration and not available of typically drive operations such as tape cartridge reads/writes.

As part of managing the data migration, the drive-based copy manager 290 is configured to partition the RAM/memory buffer 292. In some embodiments, each card 284 may perform "N" migration sessions (e.g., 1 to 3 or more sessions per card 284), and the copy manager 290 partitions the RAM/memory buffer 292 into partitions 294 such that each migration session managed by the manager 290 has its own dedicated section or portion of the RAM/memory buffer 292. Data, which is data protected by data protection application 289, from each migration session is stored in its own partition 294 prior to being loaded or written to the destination 220 over data path 298. Partitioning the RAM/memory buffer 292 further adds to the data protection provided by the data migration assembly 280 as no migration data overlaps and/or is mixed in the memory 292 or on the card 284. Stated differently, the copy manager 290 manages the data migration such that it is like each migration job or session has its own disk drive card or module 280 (i.e., a "virtual disk drive card" to perform the data migration).

To physically implement a data migration assembly such as assembly 280 of FIG. 2, one or more tape drive cards that are modified as discussed herein may be provided within an existing (or future) tape drive form factor. For example, the modified cards may be stacked within a tape drive chassis such that the assembly can be inserted into a drive slot of a tape library or a rack enclosure (a tape drive space in a rackmount or the like). This allows power, cooling, and communication to be efficiently provided to the assembly and its modified tape drive cards.

Figure 3:
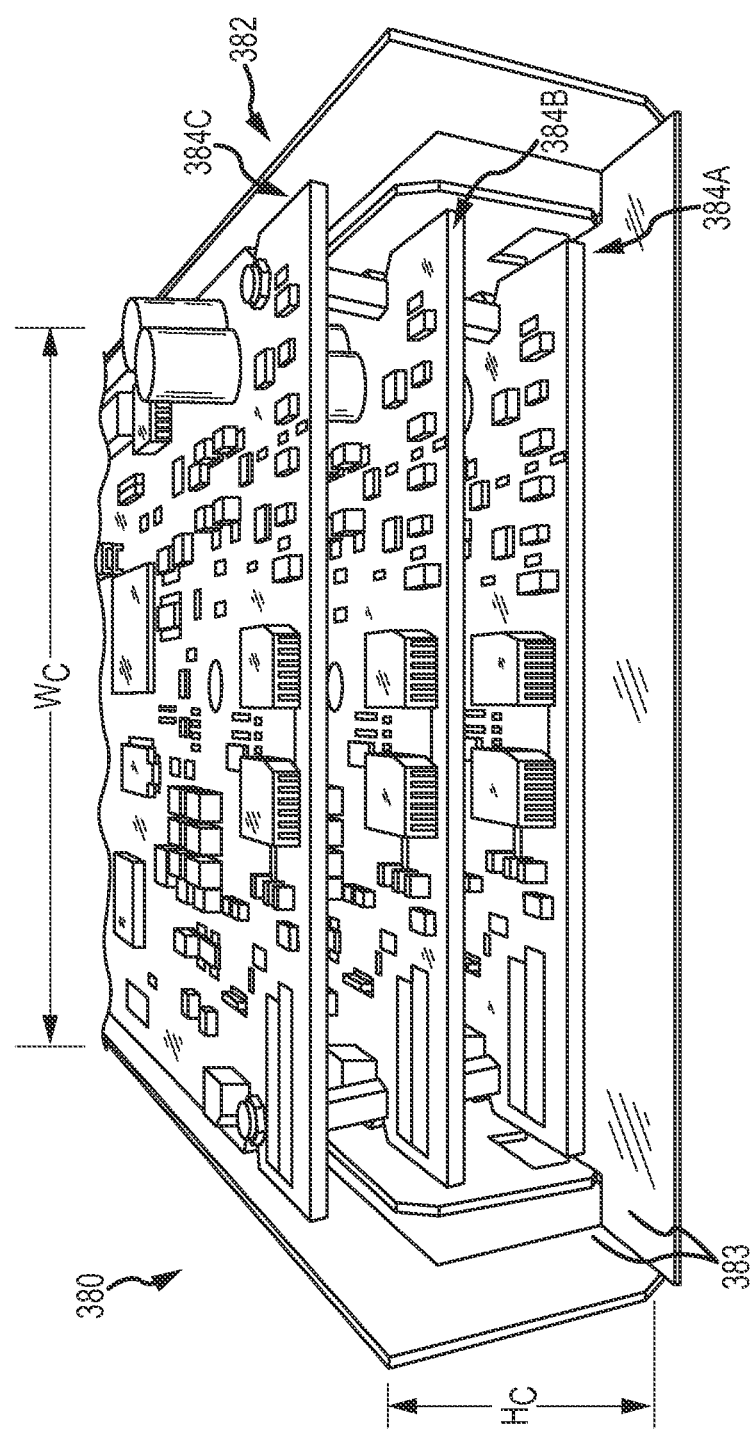
FIG. 3 is an upper front perspective view of a drive-based data migration assembly with the top and front panels removed to show a stack of three tape drive cards or modules positioned within a tape drive chassis.

FIG. 3 is an upper front perspective view of one exemplary physical implementation of a drive-based data migration assembly 380 as may be used in a data storage system, e.g., the assembly 380 may be substituted for assembly 280 of data storage system 200 of FIG. 2. The assembly 380 includes a tape drive chassis (or enclosure, box, or the like) 382 with a number of panels 383 such as top, bottom, and side panels (which may be formed out of sheet metal or the like).

In FIG. 3, the top and front panels 383 have been removed to show a stack of three tape drive cards or modules 384A, 384B, and 384C positioned within the tape drive chassis 382. For example, a lower or bottom (or first) card 384A may be mounted to the bottom or lower panel 383 of the chassis 382 with the middle or second card 384B stacked over it and the top or third card 384C stacked over the middle card 384B. Space is provided between the cards 384A, 384B, 384C to provide channels for cooling air to flow and to provide spacing for components on each board, and the power and communication connectors for each card 384A, 384B, and 384C would extend out from or be accessible via a back or rear panel 383 of the chassis 382 to allow ready connection of the assembly 380 to power sources and communication links.

The chassis 382 has a form factor defined by its height, $H_C$, and width, $W_C$, and this form factor typically matches that of a conventional tape drive used within a particular data storage system to allow the assembly 380 to be positioned in a slot/space provided for a tape drive (e.g., replace a tape drive). As shown, the form factor (or internal space) defined by the panels 383 of the chassis allows room for 1 to 3 boards 384A-384C, but it is likely that other tape drive chassis may provide room for fewer or more boards to be provided in such an assembly and these embodiments are considered within the breadth of this description. In other cases, the height or thickness of a tape drive board may vary from those shown in FIG. 3 such that fewer or more may be fit or be stackable within a particular chassis 382. In brief, the number of tape drive cards that may be included within a data migration assembly of the present invention may range from 1 to N with 1 to 3 cards only being an example for one useful assembly (e.g., for assembly 380 of FIG. 3) that may be fabricated using a tape drive chassis for a tape drive presently available (e.g., a StorageTek T10000D drive available from Oracle Corporation).

The physical installation of one to two or more additional cards within an existing or presently designed drive chassis is relatively straightforward (e.g., mechanical components for retention of cards in a stacked arrangement in the chassis, cable design to hook up the cards, re-design present rear bulkhead of tray, in some cases, to accommodate six or another number of communication (e.g., fiber) cables, and to provide power distribution to the cards (e.g., another card to disperse power to three or another number of cards in each chassis). The cost to provide the data migration assembly is expected to be much less than providing additional servers with each card typically costing $800 to $1500 compared with $15000 to $25000 for a single server. Modifications can be made to the cards, too, to reduce the cost such as by modifying the cards to eliminate particular components such as DCCM, RO, PRML, and Hermes chips.

The modifications of the software (e.g., tape drive applications) may include drive changes, library changes, and other changes (such as ACSLS changes to display new device type). The drive changes may include: modifying the manufacturing data in EEPROM to identify the tape drive card standalone; modifying the controller software to not load SERVO; modifying the controller software to disable the read/write channel, recording operations, and data compressor functions; modifying the channel interface software to not communicate to subsystems outside of the interface subsystem; and designating one of the tape drive cards in each stack (or each data migration assembly) as the library controller master. The library changes (when the data migration assembly is provided in a tape library) may include: modifying the library software to fence off the "drive" or data migration assembly; modify the library to recognize a new drive type and bypass load/unload; and provide interface changes.

Figure 4:
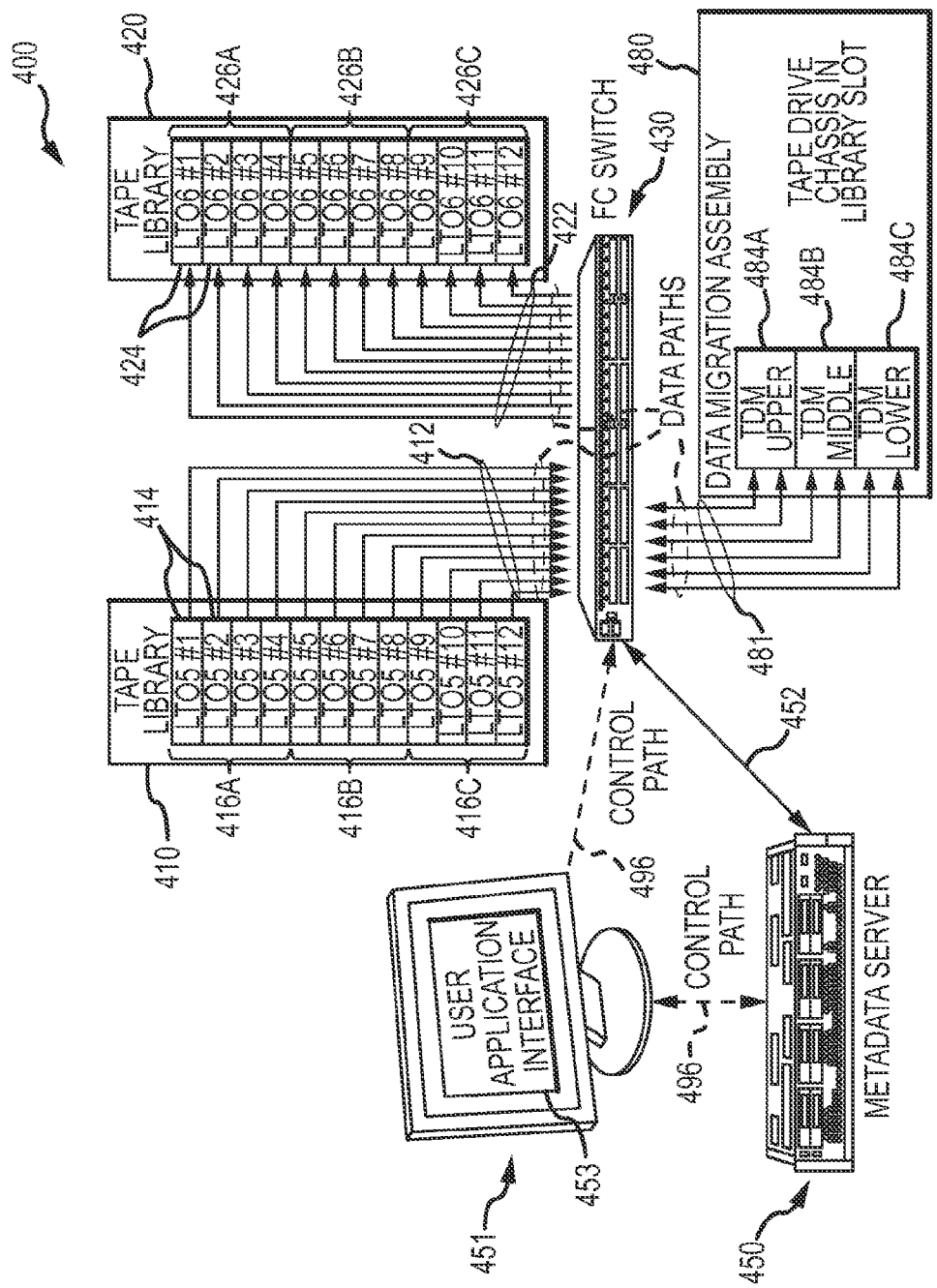
FIG. 4 is a schematic illustration of another embodiment of a data storage system with a data migration assembly managing migration or copying of data, with the data migration assembly inserted into a library slot.

FIG. 4 is a schematic illustration of another embodiment of a data storage system 400 with a data migration assembly 480 that is adapted for managing migration or copying of data from a source device(s) to a destination device(s). In this example system 400, the source of data for the migration is a first tape library 410 and the destination for the data being copied or migrated is a second tape library 420. The first tape library 410 has a number of tape cartridges 414 from which it is desired to copy data to tape cartridges 424 in the second library 420, e.g., to migrate data from a first tape technology (e.g., LTO5 or the like) to a second (e.g., newer) tape technology (e.g., LTO6 or the like). In this example, twelve tape cartridges 414, 424 are provided in each of the libraries (or twelve cartridges are affected by the migration), but this number may, of course, be smaller or greater to suit a data owner's needs and/or to suit a particular source or destination. Again, migration from one tape cartridge-to-another tape cartridge is just an example of data migration that can be managed by a data migration assembly 480, and it will be understood that nearly any device-to-device data migration or copying may be supported with the assembly 480.

The data storage system 400 further includes a data link device 430 shown to take the form of an FC switch, and the tape libraries 410, 420 are communicatively linked to each other via the data link device 430 as shown with links/connectors 412, 422. The data storage system 400 further includes a metadata server 450 connected as shown with link 452 to the tape libraries 410, 420 via the data link device 430 and links 412, 422. The server 450 runs a host or user application as discussed with reference to FIGS. 2 and 3 that acts to control and/or initiate a data migration between the libraries 410, 420 by transmitting control instructions or migration control parameters over a control path 496 between the server 450 and switch 430 (and, more specifically, to the data migration assembly 480). The system 400 further includes a monitor and/or computing device 451 that may be used by a human operator to interact with a user interface (or GUI) 453 of the host application running on server 450 (e.g., the operator may request a data migration and select or set migration control parameters to be used by the host application and transmitted over control path 496 to the data migration assembly 480).

As shown, the data storage system 400 also includes a data migration assembly 480 that is used to manage and perform the data migration from tape library 410 to tape library 420. The data migration assembly 480 includes three tape drive modules or cards 484A-484C. These may each be configured to be able to communicate with the host application on the server 450 and to respond to receipt of migration control parameters over the control path 496 by initiating and performing data migration over a data path provided by communication links 412, 422, 481 (which does not include the server 450). The cards/modules 484A-484C may be stacked within a tape drive chassis (e.g., a StorageTek T10000D chassis, a StorageTek T10000E chassis, or the like) as shown in FIG. 3. The chassis may then be inserted into a library slot (e.g., a slot of the library 410, the library 420, or another tape library (not shown) of system 400) where it can be cooled and where power and communication links 481 can readily be routed to the cards 484A-484C.

Each card/module 484A-484C may be configured as shown in FIG. 2 and function to provide the data migration with full data protection (e.g., CRC-based protection on read/write actions and/or other tape drive-based or tape drive-available data protection) over the entire data path and, particularly, within each card/module 484A-484C. As discussed with reference to FIG. 2, each of the cards/modules 484A-484C may manage one to "X" (such as 3 to 6 or more) migration sessions or jobs, and the drive-based copy manager typically will act to partition cache/RAM on the card to keep the data from being overlapped and/or interleaved during the migration to enhance data protection.

In this example, each card/module is shown to be concurrently performing/managing 4 data migration sessions or jobs with card/module 484A migrating data from a first set 416A of the source tape cartridges 414 to a first set 426A of destination tape cartridges 424, card/module 484B migrating data from a second set 416B of the source tape cartridges 414 to a second set 426B of destination tape cartridges 424, and card/module 434C migrating data from a third set 416C of the source tape cartridges 414 to a third set 426C of destination tape cartridges 424. Again, efficiency or throughput is significantly improved over the use of a server running a host application within the data path as the copy manager on the cards 484A-484C does not have to compete with other processes as the processors and communication links 481 of the assembly 480 are dedicated to performing data migration.

Figure 5:
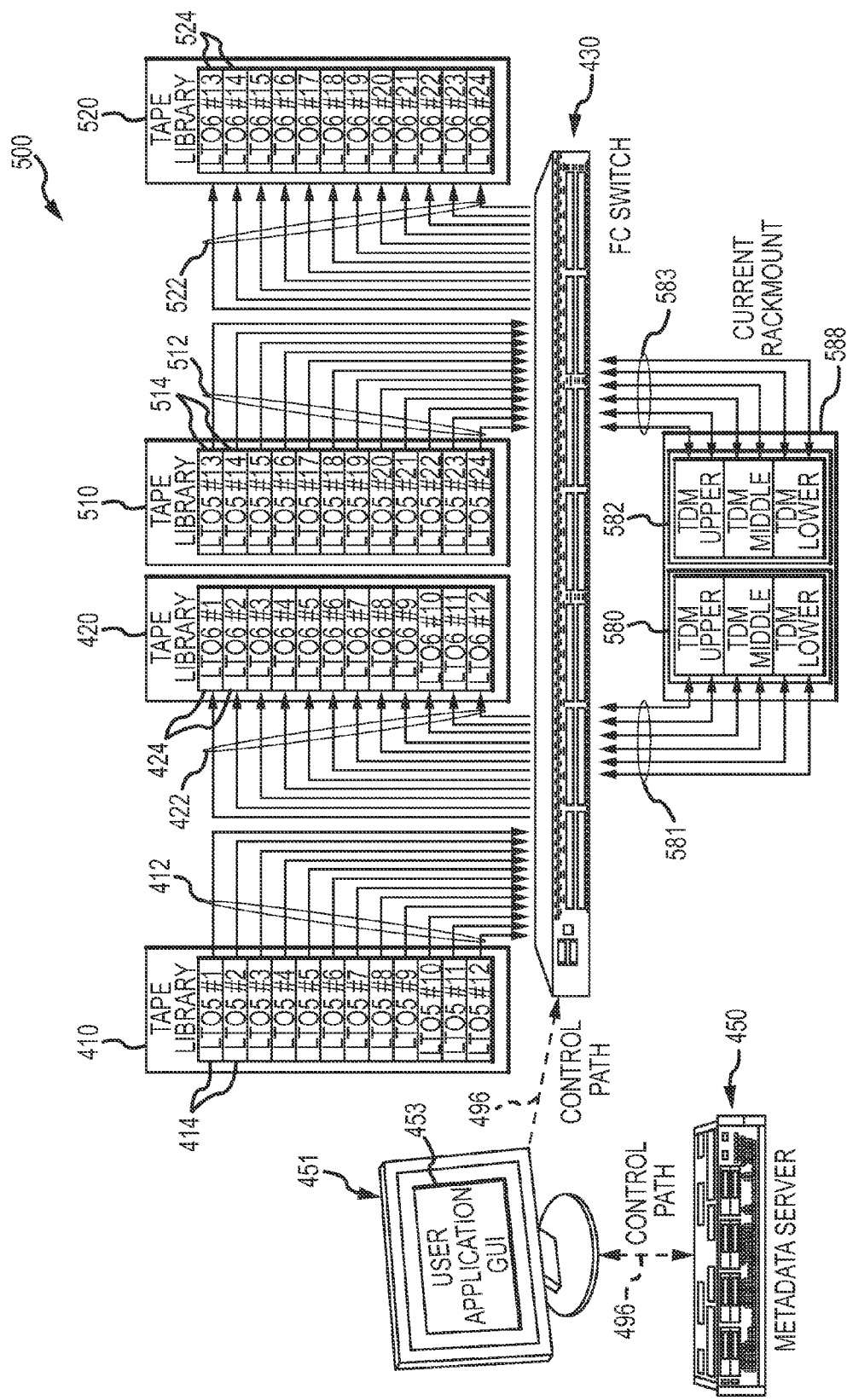
FIG. 5 is a schematic illustration of an embodiment of a data storage system with a pair of data migration assemblies provided in spaces of a rack enclosure.

FIG. 5 illustrates a data storage system 500 similar to the system 400 of FIG. 4, and a number of components found in system 400 are included in system 500 (with like reference numbers used for these components). System 500 differs from system 400 in that instead of use of a drive slot of a library one or more data migration assemblies are provided within drive spaces or slots of a rack enclosure 588. In the example shown, a first data migration assembly 580 (which may take the form of the assembly 480 shown in FIG. 4) is provided in a drive space/slot of a rack enclosure or rackmount 588. The assembly 580 is linked as shown at 581 with the first (source) tape library 410 (as discussed with reference to FIG. 4) and with the second (destination) tape library 420. The tape drive modules/cards of the data migration assembly 580 manage data migration, in response to control instructions from the host application on the server 450 over control path 496, of data from tape cartridges 414 of library 410 to tape cartridges 424 of library 420.

Additionally, though when compared with system 400 of FIG. 4, in the example shown in FIG. 5, a second data migration assembly 582 (which may take the form of the assembly 480 shown in FIG. 4) is provided in another drive space/slot of the rack enclosure or rackmount 588. The assembly 582 is linked as shown at 583 with a third (second source) tape library 510 and with a fourth (second destination) tape library 520. The tape drive modules/cards of the data migration assembly 582 manage data migration, in response to control instructions from the host application on the server 450 over control path 496, of data from tape cartridges 514 of library 510 to tape cartridges 524 of library 520. In this example, each tape drive card/module in the assemblies 580, 582 concurrently manages four data migration sessions over the data paths provided by links 412, 422, 512, 522, 581, and 583 via communication link 430. Each card/module's RAM would typically be partitioned by the on-card copy manager to isolate the migration data for each session/job while also implementing data security such as with a tape drive application(s) providing data protection processes (e.g., CRC functions for chunks of data during reads and writes).

Figure 1:
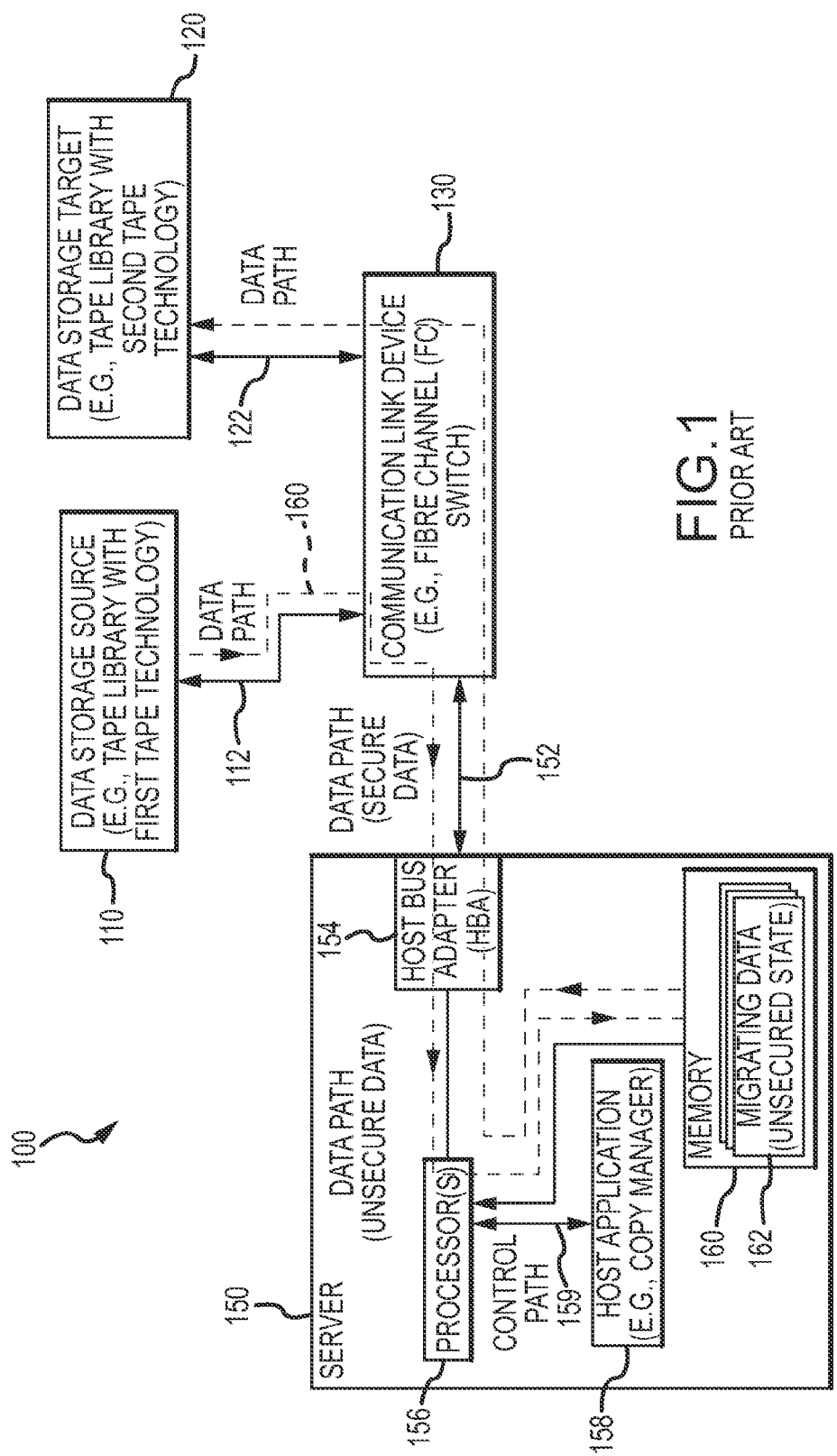
FIG. 1 is a functional block diagram of a conventional data storage system during data migration.
Figure 6:
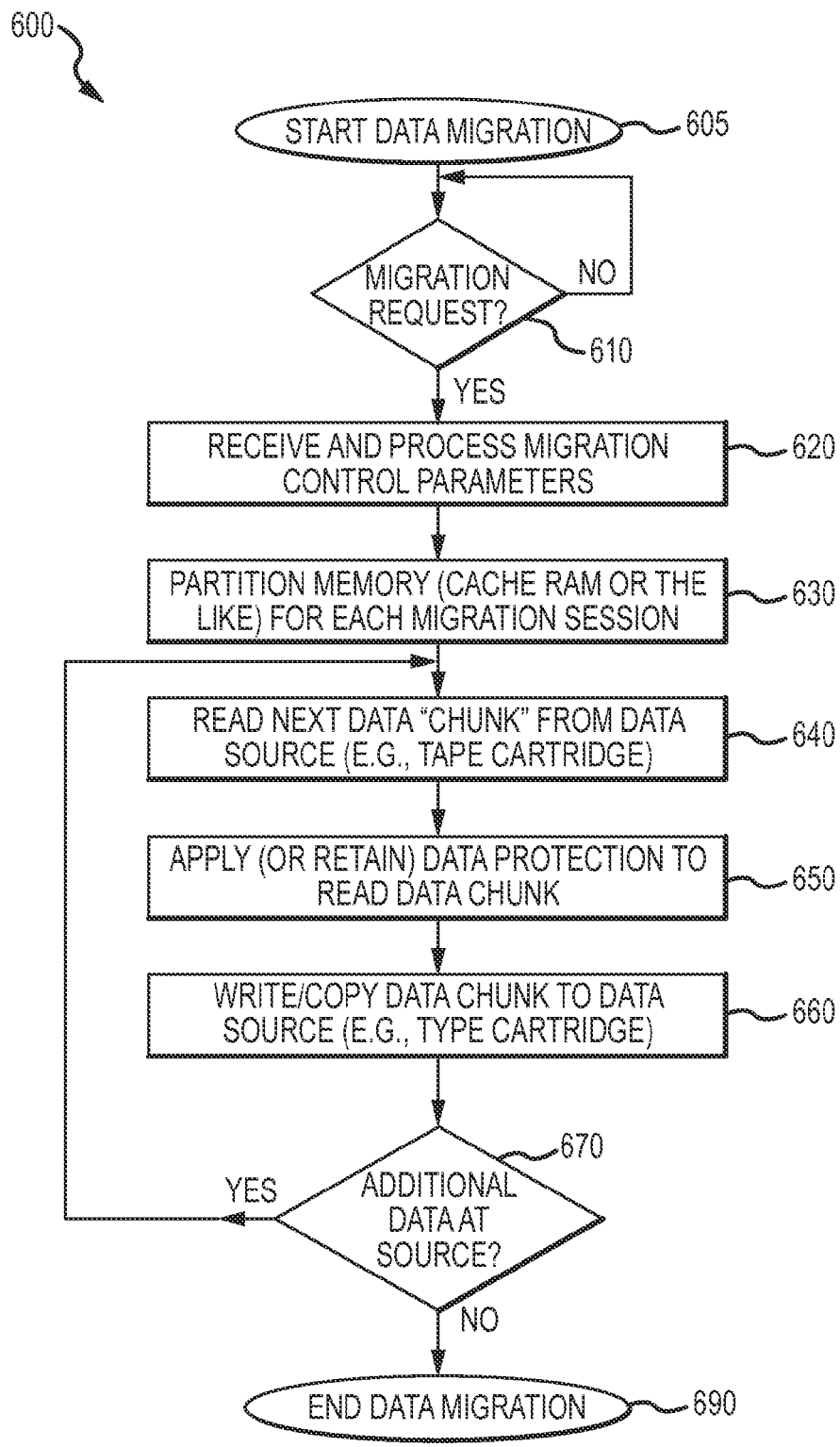
FIG. 6 is flow diagram of a data migration method that may be implemented by operation of a data storage system described herein such as the systems of FIGS. 1, 4, and 5 with or without use of the data migration assembly of FIG. 3.

FIG. 6 illustrates a flow diagram of a data migration method 600 that may be implemented by operation of a data storage system described herein such as the systems of FIGS. 1, 4, and 5 with or without use of the data migration assembly of FIG. 3. The method 600 starts at 605 such as with providing a data migration assembly, such as assembly 380 of FIG. 3, in a data storage system or network such as by placing an assembly in a tape drive box or chassis in drive slot of a tape library or in a space in a rackmount. Step 605 may involve the drive-based copy manager(s) communicating with the host application/copy manager on a communicatively linked server to indicate the presence of the drive-based data manager and/or with a library manager to indicate that the "drive" inserted in a particular drive slot is not a conventional drive for use by the library (i.e., is, instead, a dedicated migration box or device).

The data migration method 600 continues at 610 with the drive-based data manager (e.g., software and/or hardware on one of one to three or more tape drive cards) acting to communicate with a host application (e.g., a copy manager) on a system server to determine when a data migration request has been received from a data system operator. Step 610 is repeated until a request is received, and, after a migration request is received, the host application on the server generates control instructions or parameters for the data migration that are received and processed by the drive-based copy manager of the data migration assembly at step 620. These parameters, among other information, identify the data to be migrated along with identifications, location, and other information pertaining to the source data storage devices.

At step 630, the migration method 600 continues with partitioning memory such as RAM or a memory buffer on the tape drive card or module upon which the drive-based copy manager is being run by a drive card processor(s). A partition can be provided for each migration job or session identified in the migration parameters such that each migration session has dedicated memory and migration data is not mixed and does not overlap on the card's memory. In this way, the method ensures or at least enhances data integrity during the data migration process 600.

At step 640, the method 600 continues with the drive-based copy manager acting to read a next data "chunk" or portion of data from a data source (e.g., disk memory, memory devices on the Internet or other communications network (the "cloud"), a tape cartridge, or other digital data storage device). At step 650, the method 600 continues with (or this step 650 may be performed wholly or partially concurrently with step 640) retaining or applying data protection processes to the read data chunk such as CRC processes or another industry standard for maintaining data integrity during reads and writes (or data copying).

In step 660, a write or copy operation is performed by the drive-based copy manager to load the data read from the data source in step 640 to a data destination, e.g., disk memory, memory devices on the Internet or other communications network (cloud-based storage devices, one or more tape cartridges, or other digital data storage device(s)). Step 650 may be applied concurrently with step 660 so as to retain data security during the data migration 600. At step 670, the method 600 continues with determining whether there is additional data to be migrated or copied from the source to the destination, and, if yes, the method 600 continues at step 640 with reading the next chunk of data from the source (or a different source). If no more data needs to be migrated/copied, the method 600 may end at 690 such as by the drive-based copy manager communicating successful (or unsuccessful) completion of the data migration to the host application on the system server.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Restated briefly, the data storage systems described herein include tape drive-based data migration assemblies that can be implemented by modifying a tape drive to become more "server like." In some implementations, the modification involves modifying the tape drive's software to communicate with the host application (e.g., copy or data migration manager) on a system server to receive data migration parameters (or control commands) and to implement data migration under the direction of the host application. In other implementations, the modification further involves modifying an existing (or creating a new migration assembly) tape drive by removing the tape cartridge mechanics/elements to allow "stacking" of one or more additional tape drive digital technology cards (or "tape drive modules or cards" as labeled in some of the figures attached) inside of the tape drive chassis.

In this way, the new data migration assemblies can be inserted into tape drive slots of tape libraries or rack-based mounting of a data storage system in place of a tape drive to provide a dedicated device within the library or storage network for performing data migration. The migration assemblies improve performance of the data storage system, at least in part, because the tape drive module or card does not have other running processes that are contending for data processing bandwidth (e.g., of the main processor chip as is the case with host applications on servers). The use of the data protection provided on the tape drive card or module also substantially reduces the risk of undetected data errors in a data migration. Security can also be enhanced because the data protection application may be configured to support encryption of data in the data path, which would not be available in a server using the host application to provide data migration.

When designing a data storage system, a number of factors should be considered with regard to data migration including: data integrity; performance; scalability; features; ease of use; availability; product cost; and engineering effort (or development cost). The data migration assemblies described above that use tape drive technologies in a new and unique way are suitable for use as they provide improved data integrity (i.e., data protection throughout the process), they increase performance (e.g., dedicated processors so no competition for bandwidth with other functions), the assemblies facilitate horizontal scaling, the assemblies are easy to use and install, the assemblies make use of modified drive cards such that they are readily available and require less engineering effort, and the migration assemblies have a relatively low product cost especially when compared with the purchase of additional servers. With regard to bandwidth, it is expected that a box/chassis with three tape drive cards (as presently available) may be able to saturate the channel interface(s) as a maximum channel bandwidth such that this bandwidth would be achievable with a data migration assembly inserted in a library slot whereas twice this bandwidth may be achievable in a typical rackmount space that accepts (with present drive and rack enclosure designs) two tape drives (so two data migration assemblies).

We claim:

1. A data migration assembly, comprising:
a chassis configured for insertion into a tape drive slot of a tape library or a rack enclosure; and
a first tape drive card supported within an interior space of the chassis, the first tape drive card includes:
a processor; and
a copy manager run by the processor that is adapted to communicate with a host application, running on a server communicatively linked to the first tape drive card, during a data migration to receive data migration control parameters and, in response, to copy a set of data from one or more source data storage devices to one or more destination data storage devices,
wherein the first tape drive card further comprises one or more memory devices providing random access memory (RAM) and
wherein the copy manager partitions the RAM into a number of partitions for use in performing a like number of migration sessions, whereby each of the migration sessions has a dedicated portion of the RAM.

2. The data migration assembly of claim 1, wherein the number of migration sessions is greater than two and wherein the migration sessions are performed concurrently by the copy manager.

3. The data migration assembly of claim 1, wherein the first tape drive card further comprises a data protection application run by the processor that applies a data protection process to the set of data during reads from the one or more source data storage devices and during writes to the one or more destination data storage devices.

4. The data migration assembly of claim 3, wherein the data protection process comprises performing cyclic redundancy checks (CRCs).

5. The data migration assembly of claim 3, wherein the data protection process is performed whereby data encryption is provided during the reads and the writes.

6. The data migration assembly of claim 1, further comprising a second and a third tape drive card with a configuration matching the first tape drive card, the second and third tape drive cards being provided in a stacked arrangement with the first tape drive card within the interior space of the chassis.

7. The data migration assembly of claim 6, wherein the chassis is free of tape cartridge handling components.

8. A data storage system adapted for performing a data migration from a data source to a data destination, comprising:
a server including a processor running a host application generating control parameters defining the data migration of data from the data source to the data destination;
an enclosure with a slot configured for receiving a tape drive; and
a data migration assembly inserted into the slot of the enclosure and communicatively linked to the data source, the data destination, and the server,
wherein the data migration assembly includes a processor running a copy manager receiving the control parameters and performing the data migration based on the control parameters,
wherein the performing of the data migration includes providing data protection to data extracted from the data source and loaded onto the data destination during the data migration,
wherein the data migration assembly includes a tape drive chassis and a card upon which the processor is mounted, the card being supported within the interior space of the tape drive chassis,
wherein the data migration assembly further includes at least a second card upon which an additional processor is mounted that runs an additional copy manager for receiving a subset of the control parameters and for performing a subset of the data migration based on the subset of the control parameters, and
wherein the performing of the subset of the data migration by the additional copy manager is performed concurrently with the performing by the copy manager on the card.

9. The data storage system of claim 8, wherein the data source comprises a tape library comprising a plurality of tape cartridges and wherein the copy manager and the additional copy manager each concurrently and independently performs at least two migration sessions to copy data from first and second sets, respectively, of the tape cartridges to the data destination.

10. The data storage system of claim 8, wherein data copied from the data source to the data destination follows a data path through the data migration assembly and wherein the data path excludes the server.

11. The data storage system of claim 8, wherein the data protection comprises data encryption or is CRC based.

12. The data storage system of claim 8, wherein the enclosure comprises a tape library or a rack enclosure.

13. The data storage system of claim 8, wherein the data migration assembly further includes RAM and wherein the copy manager partitions the RAM into partitions that are each used for storing data associated with only one migration session being performed by the copy manager.

14. A data migration method, comprising:
   with a data migration assembly inserted into a tape drive slot, extracting data from a data source device;
   first applying a data protection process on the extracted data;
   after the applying of the data protection process, storing the extracted data in a memory buffer of the data migration assembly;
   from the memory buffer, loading the extracted data onto a data destination device, wherein the loading includes second applying the data protection process on the extracted data.

15. The method of claim 14, wherein the data protection process includes performing a CRC.

16. The method of claim 14, further including partitioning the memory buffer into a plurality of partitions and wherein the storing of the extracted data includes storing the extracted data in one of the partitions associated with a migration session for the data source device.

17. The method of claim 14, further including receiving with the data migration assembly migration control parameters from a host application running on a server communicatively linked to the data migration assembly, and wherein the extracting of the data and the loading of the extracted data are performed based on the migration control parameters.

18. A data storage system adapted for performing a data migration from a data source to a data destination, comprising:
   a server including a processor running a host application generating control parameters defining the data migration of data from the data source to the data destination;
   an enclosure with a slot configured for receiving a tape drive; and
   a data migration assembly inserted into the slot of the enclosure and communicatively linked to the data source, the data destination, and the server,
   wherein the data migration assembly includes a processor running a copy manager receiving the control parameters and performing the data migration based on the control parameters,
   wherein the performing of the data migration includes providing data protection to data extracted from the data source and loaded onto the data destination during the data migration,
   wherein the data migration assembly further includes RAM, and
   wherein the copy manager partitions the RAM into partitions that are each used for storing data associated with only one migration session being performed by the copy manager.

19. The data storage system of claim 18, wherein the data migration assembly includes a tape drive chassis and a card upon which the processor is mounted, the card being supported within the interior space of the tape drive chassis.

20. The data storage system of claim 18, wherein data copied from the data source to the data destination follows a data path through the data migration assembly and wherein the data path excludes the server.

21. The data storage system of claim 18, wherein the data protection comprises data encryption or is CRC based.

22. The data storage system of claim 18, wherein the enclosure comprises a tape library or a rack enclosure.

* * * * *

UNITED STATES PATENT AND TRADEMARK OFFICE
CERTIFICATE OF CORRECTION

PATENT NO.         : 9,443,550 B2                                               Page 1 of 1
APPLICATION NO.    : 14/609497
DATED              : September 13, 2016
INVENTOR(S)        : Hostetter et al.

It is certified that error appears in the above-identified patent and that said Letters Patent is hereby corrected as shown below:

In the Specification

In Column 9, Line 21, delete "chassis)." and insert -- chassis)). --, therefor.

Signed and Sealed this
Twenty-fifth Day of April, 2017

Michelle K. Lee
*Director of the United States Patent and Trademark Office*